Sept. 20, 1966          L. MEYERS          3,274,095

MEANS FOR TRANSFER OF IONS

Filed Jan. 17, 1962          2 Sheets-Sheet 1

INVENTOR.
LAURENCE MEYERS
BY
ATTORNEYS

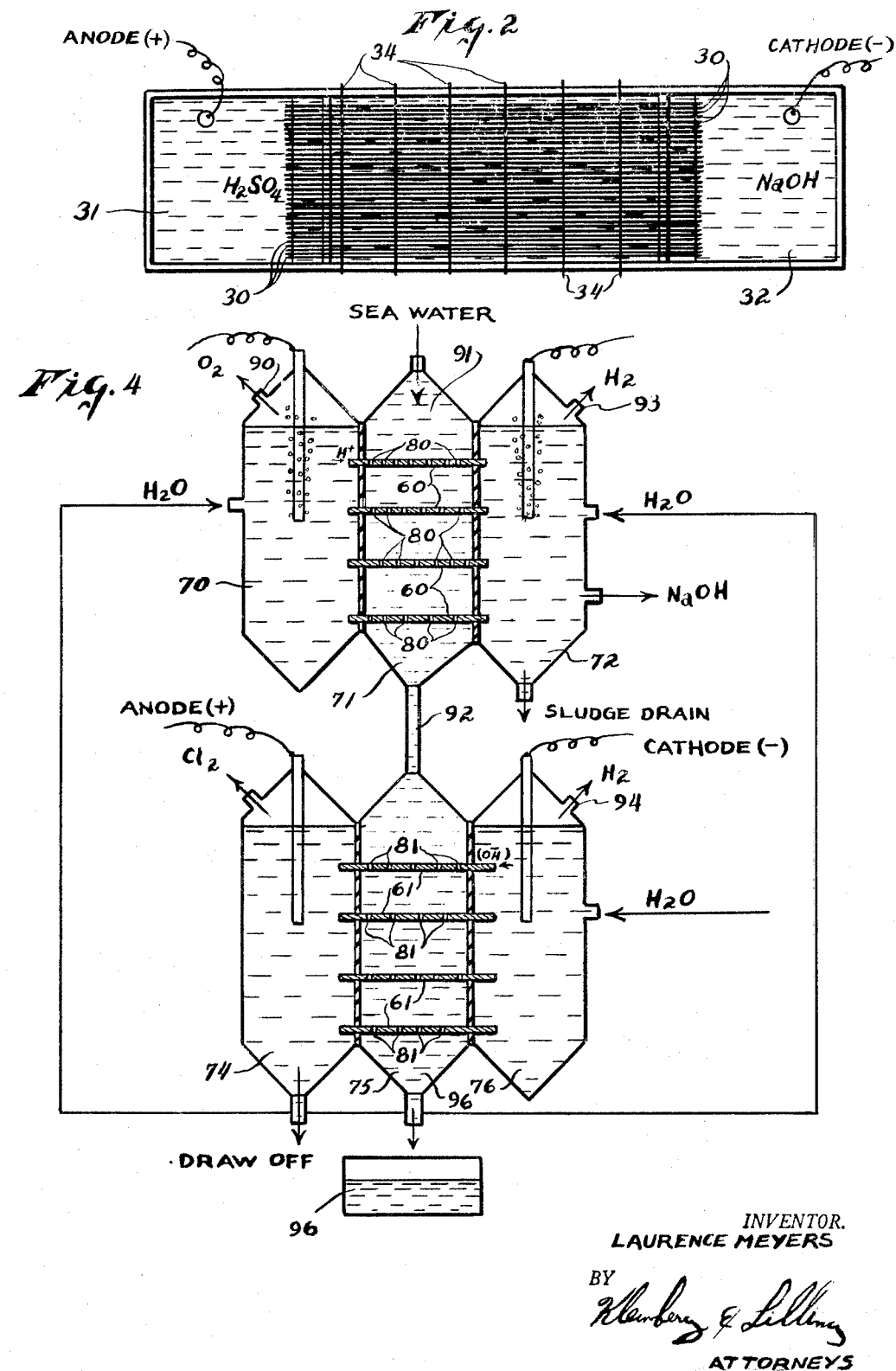

United States Patent Office 3,274,095
Patented Sept. 20, 1966

3,274,095
MEANS FOR TRANSFER OF IONS
Laurence Meyers, Rego Park, N.Y.
(3736 High Vista Drive, Dallas, Tex. 75234)
Filed Jan. 17, 1962, Ser. No. 166,750
2 Claims. (Cl. 204—301)

This invention is generally in the art of altering chemical compositions by means of a transfer and exchange of ions under the influence of an electric current.

Much of the world's available water supply contains dissolved salts, such as sodium chloride. This renders the water unfit for drinking. There is great need, therefore, for an efficient and inexpensive method of desalination.

It is known to utilize ion exchange materials to effect such treatment. Such methods, however, are expensive in that they will require relatively large quantities of chemical regenerants. After the said ion exchange materials have become exhausted because of the contact with the saltwater, they must be regenerated by relatively expensive chemicals and equipment. Thus, it will be seen that it will not be commercially feasible to utilize such processes.

It is a primary object of this invention, therefore, to provide a process for modifying the chemical composition of substances such as saltwater, conveniently and efficiently.

Another cardinal object hereof is to set forth an apparatus for accomplishing the above that will not consume large quantities of expensive chemicals.

Another object and accomplishment hereof is to set forth a process for making saltwater potable that will incidentally produce valuable by-products.

When salts are dissolved in water, they disassociate into tiny electrically charged particles known as ions. For example, if ordinary table salt (sodium chloride is dissolved in water, the sodium will disassociate from the chloride forming positively charged sodium ions and negatively charged chloride ions. The positively charged ions are known as cations, and the negatively charged ions are known as anions. The anions will have a tendency to be attracted to anodes (positively charged electrode) and the cations will have a tendency to be attracted to a cathode (negatively charged electrode).

It is well known to prepare ion exchange materials for such processes as materials recovery and water purification, in sheet-like or membrane form. A permselective membrane is one which when subjected to a potential gradient, permits passage of cations to the exclusion of anions, or vice-versa. A membrane which permits the passage of cations, is called a cation-permeable membrane. A membrane which permits the passage of anions, is called an anion-permeable membrane.

This invention contemplates a relatively new technique in the utilization of ion exchange materials. A novel ion exchange mat is herein described which will not require expensive chemical regeneration and which will be capable of accomplishing many new and varied processes.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 2 is a top plan view of a first alternate embodiment thereof.

FIG. 4 is an elevational diagrammatic view of a third alternate embodiment of the instant invention.

Figure 1:
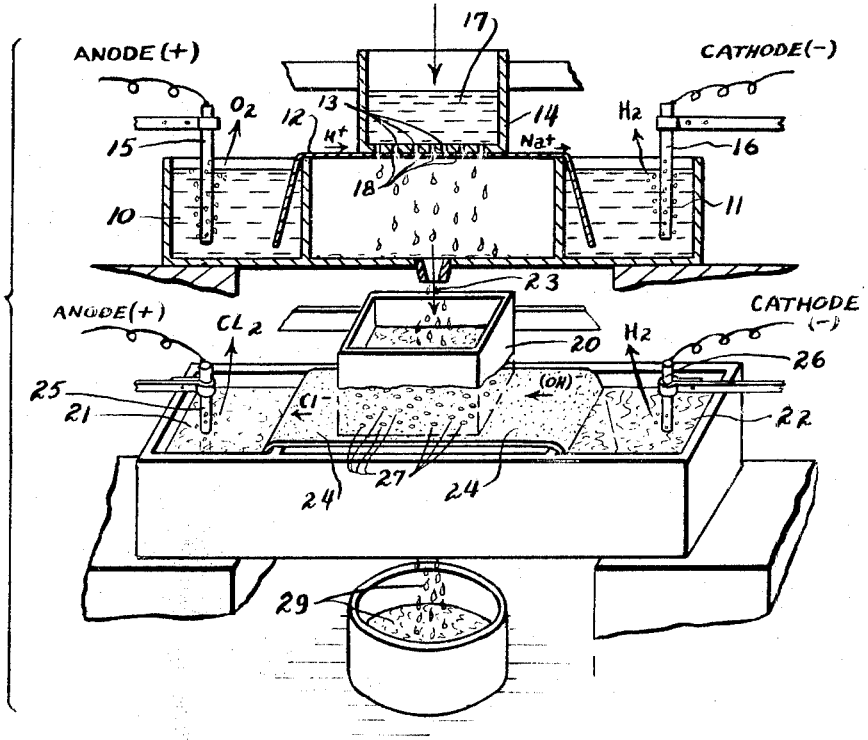
FIG. 1 is a view partly in section and partly in perspective with parts broken away illustrating one complete working embodiment of the instant invention.

Referring now particularly to FIG. 1, there is shown one simplified embodiment of the invention. The upper and lower portions of the device illustrated therein are substantially identical, but the upper portion is shown in section, and the lower portion is perspective, for ease of explanation. A portion of one of the lower tanks has been broken away.

In the said figures, fluid chamber 10 will contain a solution such as sulphuric acid, and spaced chamber 11 will contain a solution such as sodium hydroxide. A cation exchange mat 12 will extend from the interior of chamber 10 to the interior of chamber 11 directly under an intermediate chamber 14 with a bottom with openings 13. As illustrated, an electrically charged anode 15 will be inserted within chamber 10 and a charged cathode 16 will be inserted within chamber 11.

Means will be provided to allow fluid to pass through the portion of the cation exchange mat 12 under the intermediate chamber 14. As an example, the said means may a multiplicity of relatively small openings 18.

The operation of this first or upper portion of the simplified embodiment of the invention will be set forth below:

The sulphate ions of the sulphuric acid in chamber 10 will be attracted to the anode 15 where they will give up electrons and recombine with the water to again form sulphuric acid, releasing oxygen gas.

The hydrogen ions of the sulphuric acid, however, will be attracted to the cathode 16 of chamber 11. The said hydrogen ions, therefore, will travel from chamber 10 on the cation exchange mat 12 towards the cathode 16.

Chamber 14 will contain saltwater 17 to be altered. A portion of the said water 17 will be allowed to pass through the multiplicity of perforations 18 by trickling through the openings 13.

As explained above, the salt in the water 17 will be disassociated into sodium ions and chloride ions. In the area of the perforations 18 there will be an exchange of hydrogen and sodium ions. The sodium ions will replace the hydrogen ions on the mat 12. The mat 12 in turn will release its hydrogen ions into the saltwater solution. The solution will, therefore, be converted from ordinary sodium chloride salt into a solution of hydrochloric acid.

The sodium ions on the mat 12 will continue to travel into the chamber 11 until they reach the cathode 16. At the cathode 16 the sodium will pick up free electrons and become free sodium which will combine with the water to form additional sodium hydroxide and incidentally, release hydrogen gas.

The above portion of the process, therefore, has consumed water, salt, and electric current and has yielded oxygen, hydrogen, hydrochloric acid and sodium hydroxide, all of which are commercially valuable.

The hydrochloric acid 23 falling from intermediate chamber 14 through mat 12 will collect in the second intermediate chamber 20. Chamber 21 of the assembly contains an ionized solution such as hydrochloric acid. Chamber 22 contains a solution such as sodium hydroxide. The ends of an anion exchange mat 24 are emersed in chambers 21 and 22 and the said mat passes directly under the second intermediate chamber 20. As above, a charged anode 25 is placed within chamber 21 and a charged cathode 26 is placed within chamber 22.

The sodium ions of the solution in chamber 22 are attracted to the cathode where they absorb electrons and become free sodium. The sodium in turn reacts with water to again form sodium hydroxide and incidentally, produces additional hydrogen gas. The hydroxyl ions of the sodium hydroxide in chamber 22 will be attracted to the anode in chamber 21. They will, therefore, travel through the mat 24 towards the anode 25.

The second intermediate chamber 20 will permit a predetermined quantity of the hydrochloric acid 23 stored therein to trickle through the anion exchange mat 24. For this purpose, the second intermediate chamber 20 may have calibrated openings at its bottom, and the anion exchange mat may be provided with a multiplicity of perforations 27.

At the perforations 27, however, the hydroxyl ions on the mat 24 will be replaced by the chloride ions from the hydrochloric acid passing therethrough. The hydroxyl ions in turn, will replace the chloride ions in the hydrochloric acid, thereby forming hydrogen hydroxide which will, of course, immediatey turn into pure water 29.

The chloride ions leaving the mat 24 will enter chamber 21 and will finally reach the anode 25. The chloride ions will there give up electrons and become chlorine gas.

To recapitulate, sodium chloride and water 17 entered the apparatus at the intermediate chamber 14 and by means of a transfer of ions became hydrochloric acid 23. The hydrochloric acid 23 in turn became pure water by means of a second transfer of ions.

Incidentally, of course, valuable by-products were produced. The second half of the process will produce chlorine gas and hydrogen gas. It is contemplated that the by-products produced could be utilized to recapture the expense of the electrical energy utilized by this process.

It will be realized that commercial ion exchange mats could be produced in many ways and for many similar purposes. For example, it could be constructed as an ion exchange material with perforations in it backed by an inert screen for physical support. The supporting screen should be an insulating material such as nylon, or the like. Further, it could be constructed itself as a screen or mesh.

There is illustrated in FIG. 2 one such alternate assembly for an ion exchange mat. As therein shown, in plan, ion exchange material will be formed into a plurality of closely spaced and parallel fibers 30 which will extend substantially horizontally from one chamber 31 to a second chamber 32. Supporting members or fibers 34 constructed from a strong inert and insulating material such as nylon, may be passed under the ion exchange fibers 30. The salt solution or the like may then be passed through the closely spaced and parallel fibers 30, exchanging ions as previously explained in detail.

It will be noted that the ion exchange mats hereinabove described will continue to function a short time after electrical current in the anode and cathode are discontinued. This is important in that the efficiency of the process will be dependent upon the completeness of the ion exchange.

For example, referring to FIG. 2, if hydrogen ions will leave chamber 31 faster than they can be exchanged by the fibers 30, electrical energy will be wasted. However, this can be avoided by intermittently applying current to the anode and cathode, the duration of which is determined by the concentration of the salt solution and its flow rate past the fibres 30.

Figure 3:
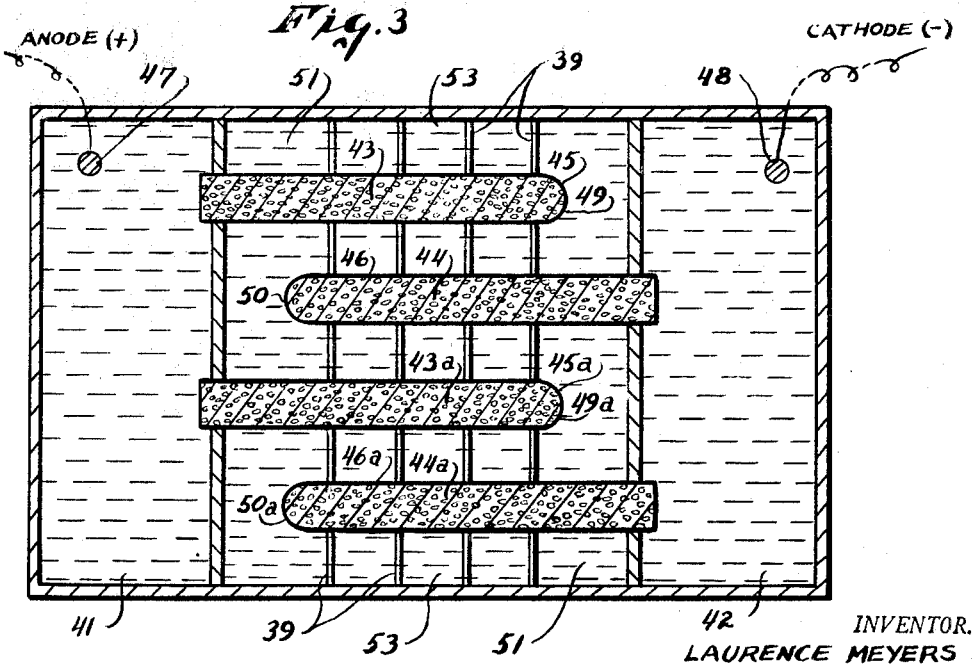
FIG. 3 is a top plan view of a second alternate embodiment thereof.

There is illustrated in FIG. 3, a more mechanical ion exchange mat. In that view, the ion exchange material may project horizontally but not all the way from a first chamber 41 to a second chamber 42.

Each of the projecting members or fibers 49, 49a, 50 and 50a will have a center core constituted of absorbent or porous material as at 43, 43a, 44 and 44a, or may be hollow. The exterior of the projecting members 49, 49a, 50 and 50a are each coated with a dense and highly selective cation exchange material 45, 45a, 46 and 46a. Of course, the portion of each projecting member within the chambers 41 and 42 will be open to receive the fluid therewithin.

Periodical supporting members or fibers 39 may be constructed from an inert material such as nylon, to prevent movement of the projecting members or fibers 49, 49a, 50 and 50a.

If chamber 41 and members 49 and 49a contain sulphuric acid and chamber 42 and members 50 and 50a contain sodium hydroxide, and saltwater 51 is applied at the intermediate chamber 53, hydrogen ions will be released into the salt solution 51 through cation exchange material 45 and 45a. Members 50 and 50a in turn will absorb sodium ions from the solution 51 through cation exchange material 46 and 46a.

Thus, the solution within chamber 53 will be altered as desired (in the above example to hydrochloric acid) and may be further acted upon to produce relatively pure water.

It will be realized, however, that this more mechanical ion exchange mat will not continue ion exchange after current to the anode 47 and the cathode 48 is discontinued. Further, such a mat will become ineffiecient should the solution passing through the chamber 53 become depleted in ions. Of course, it will be possible to connect the members 49, 50, 49a and 50a with cation exchange material to form a continuous ion exchange mat, as previously mentioned. Such connection may be comprised of cation exchange fibers replacing the inert fibers such as 39, thereby forming a continuous ion exchange mat.

It may be desirable, when treating seawater or brine, to use the more mechanical exchange mats when the salt concentration is high. After the salt concentration is lowered, the fluid may be passed through a true ion exchange mat with the current operating only for intermittent periods.

There is allustrated in FIG. 4, one proposed embodiment of a desalination plant. Chambers 70, 71 and 72 will be separated dielectrically as will be chambers 74, 75 and 76. There will be contained in chamber 70 a solution such as sulphuric acid. Contained in chambers 72 and 76 will be a solution such as sodium hydroxide. A solution such as hydrochloric acid will be contained within chamber 74. The perforated cation exchange mats will be positioned as shown at 60. There will similarly be positioned between chambers 74 and 76 a plurality of spaced and parallel anion membrane mats 61.

Of course, the thickness of the said mats and the mesh size of the perforations 80 and 81 therethrough will be dependent upon flow rates, electrical current applied, number of mats, physical dimensions of the apparatus, etc. The filtered chlorinated seawater will be conducted into the chamber 71. The process will be conducted as previously described.

The operation and function of this embodiment of the instant invention is as hereinabove described for FIG. 1, to wit:

(a) Chamber 70 will yield oxygen as at 90 and hydrogen ions to the exchange mats 60, using up water.

(b) The sodium ions in the salt solution 91 flowing by will replace the hydrogen ions on the exchange mats 60 producing hydrochloric acid at 92.

(c) The sodium ions on the exchange mats 60 travel to chamber 72 flowing additional sodium hydroxide and further yielding hydrogen gas at 93 and using up water.

(d) Chamber 76 yields hydroxyl ions to the exchange mats 61 and hydrogen gas at 94, using up water.

(e) The chlorine ions in the solution 92 replace the hydroxyl ions on the exchange mat, producing hydrogen hydroxide, which becomes water at 95.

(f) The chloride ions on the exchange mats 61 travel to chamber 76 forming chlorine gas.

Of course it may be desirable to repeat the process one or more times in order to insure complete desalination. If it is repeated, however, it will be necessary to activate the electric current only during decreasingly intermittent periods.

Seawater contains ions other than sodium chloride and they will be similarly acted upon.

It will be realized that the concept of utilizing an ion exchange mat is revolutionary and can be utilized in many shapes and manners to produce more efficient results or results other than herein set forth.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described my intention and illustrated its use, what I claim as new and desire to secure by Letters Patent is:

1. In an apparatus for the modification of water containing dissolved salts, the combination comprising: means for collecting and feeding water transversely through a perforated area of a cation exchange mat, two separate chambers for respectively giving and receiving cations, said cation exchange mat extending longitudinally between said chambers, the opposite non-perforated end portions of said cation exchange mat being partially immersed in each of said respective chambers, and, second means for receiving and feeding the fluid from said perforated area of said cation exchange mat transversely through a perforated area of an anion exchange mat, two separate chambers for respectively giving and receiving anions, said anion exchange mat extending longitudinally between said chambers, the opposite non-perforated end portions of said anion exchange mat being partially immersed in each of said respective chambers, and, second whereby each of said mats provides paths for the continuous flow of ions longitudinally therethrough and means for the flow of fluid transversely therethrough.

2. An apparatus according to claim 1, including a plurality of cation exchange mats extending longitudinally between the said two separate chambers for respectively giving and receiving cations, and, a plurality of anion exchange mats extending longitudinally between said two separate chambers for respectively giving and receiving anions.

References Cited by the Examiner

UNITED STATES PATENTS

| | | | |
|---|---|---|---|
| 2,980,598 | 4/1961 | Stoddard | 204—151 |
| 3,074,864 | 1/1963 | Gaysowski | 204—180 |

FOREIGN PATENTS

| | | |
|---|---|---|
| 815,154 | 6/1959 | Great Britain. |

JOHN H. MACK, *Primary Examiner.*

D. R. JORDAN, *Assistant Examiner.*